Feb. 2, 1937.    I. JEPPSSON ET AL    2,069,654
VEGETABLE PEELER
Filed May 27, 1933    4 Sheets-Sheet 1
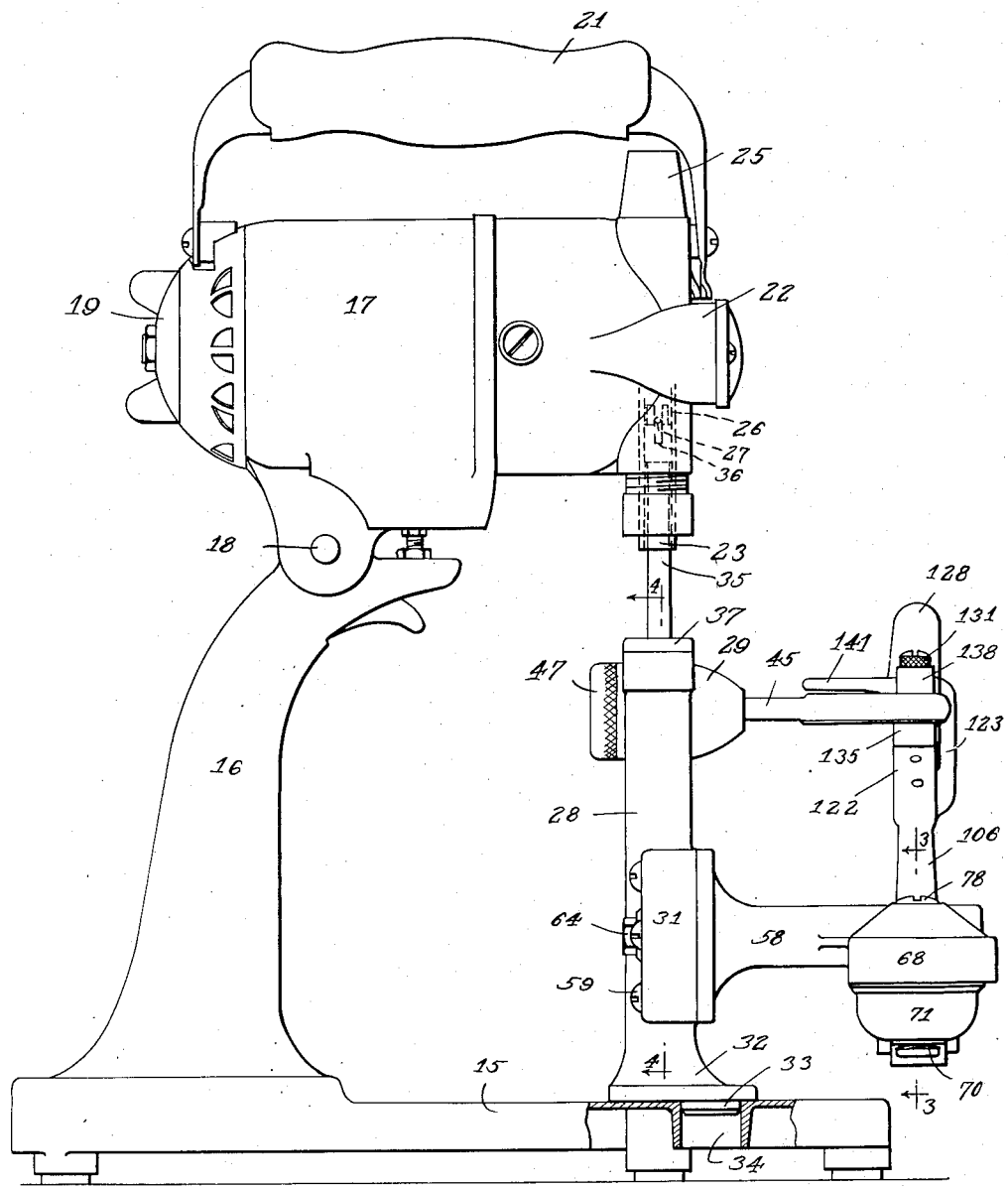

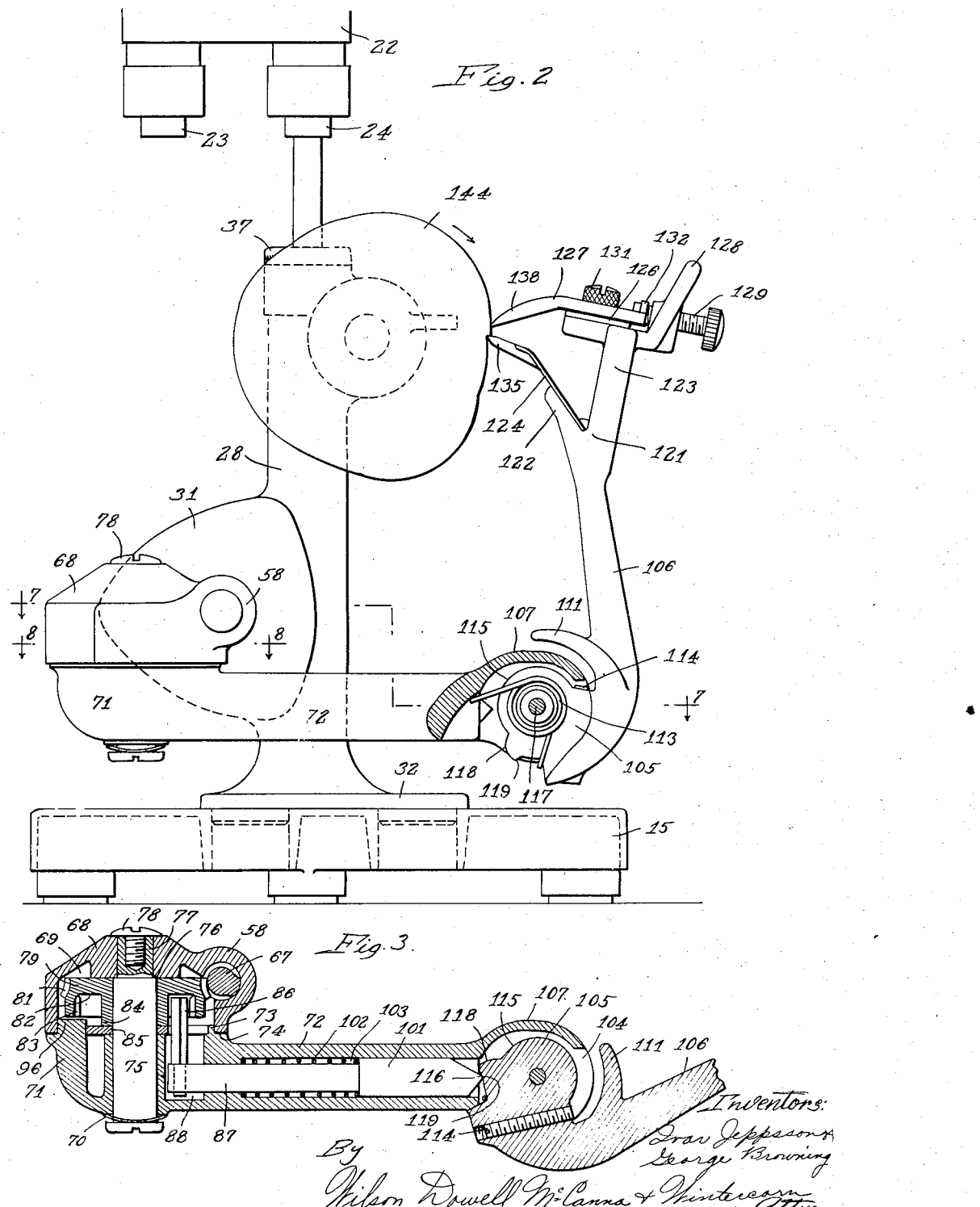

Feb. 2, 1937. I. JEPPSSON ET AL 2,069,654
VEGETABLE PEELER
Filed May 27, 1933 4 Sheets-Sheet 3
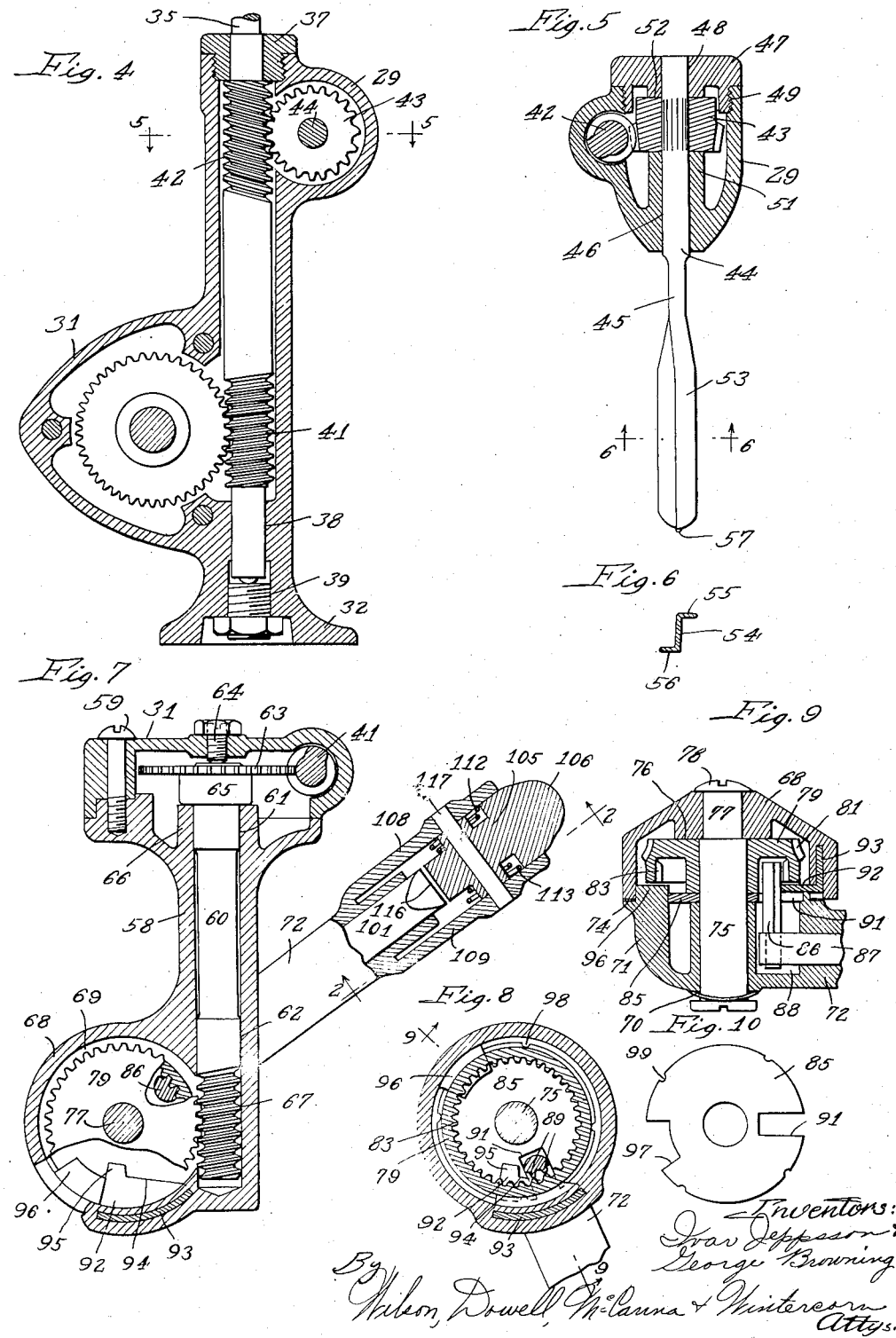

Feb. 2, 1937.    I. JEPPSSON ET AL    2,069,654
VEGETABLE PEELER
Filed May 27, 1933    4 Sheets-Sheet 4
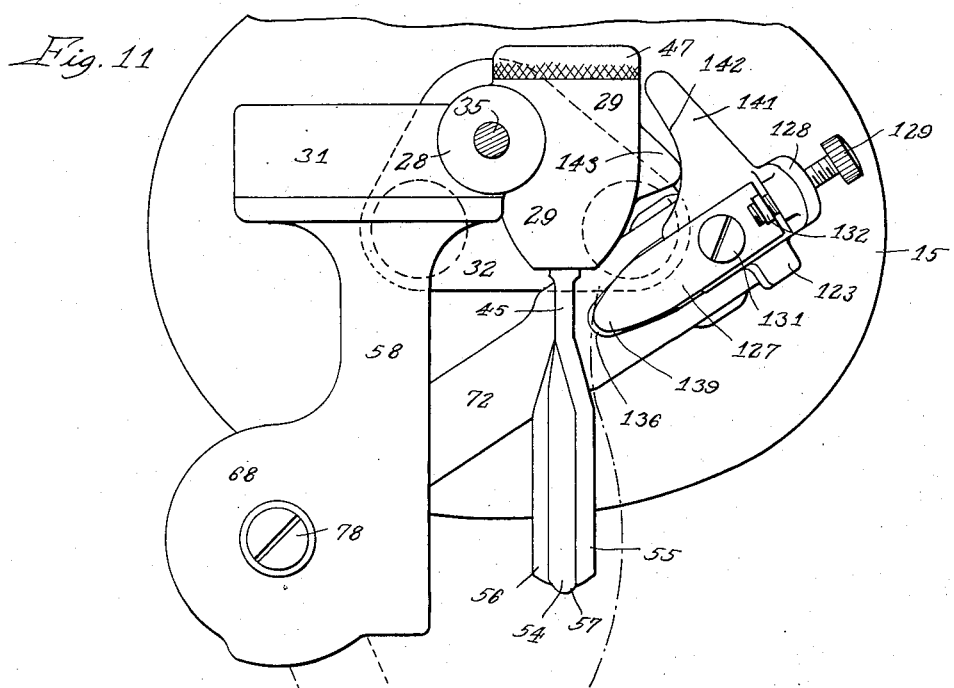
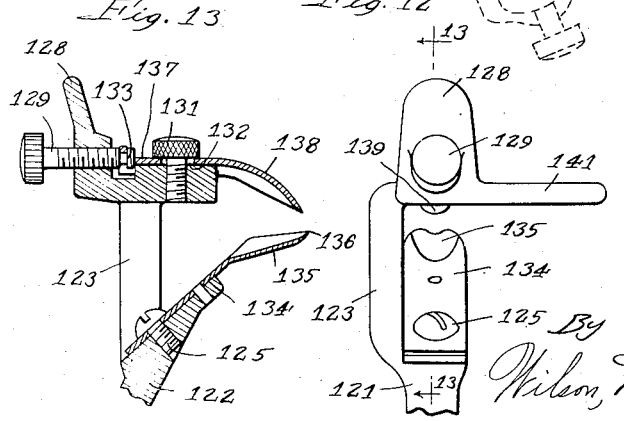
Inventors:
Ivar Jeppsson &
George Browning
By
Wilson, Dowell, McCanna & Wintercorn
Attys.

Patented Feb. 2, 1937

2,069,654

UNITED STATES PATENT OFFICE 2,069,654

VEGETABLE PEELER

Ivar Jeppsson, Chicago, Ill., and George Browning, Wilmette, Ill., assignors to Chicago Flexible Shaft Company, Chicago, Ill., a corporation of Illinois Application May 27, 1933, Serial No. 673,220

11 Claims. (Cl. 146—43)

This invention relates to vegetable peelers of the type wherein the vegetable is rotated and a cutter is moved along the surface of the vegetable parallel with the axis of rotation thereof to remove the peel from the vegetable.

There are a number of difficulties surrounding the provision of vegetable peelers for ordinary household use which have heretofore prevented the common use of such devices. The designs have been such that a large amount of mechanism has been required to produce the necessary movements which has rendered the machines expensive and unwieldly. The operation of the device has been cumbersome and slow so that little or no advantage has resulted from the use of the machine. The devices have been prone to clog up, due to the accumulation of juices, peelings, and other products of the peeling operations which are a considerable source of difficulty because of their physical and chemical nature. A further objection to the devices heretofore known is that they have required the constant attention of the operator so that the operator must start the peeling operations and attend the device to shut off the power when the peeling operation is completed.

An object of the invention is to provide a generally improved vegetable peeler of greater efficiency and simplified design wherein the instrumentalities are of such a nature and so arranged that a large amount of mechanism is eliminated and new and useful functions result.

A further object of the invention is the provision of a vegetable peeler having an impaler and a cutter, both of which are driven from a single spindle through a pair of worms and worm gears.

We have also aimed to provide a vegetable peeler wherein the worms are oppositely pitched so as to substantially eliminate end thrust on the spindle.

Another object of the invention is the provision of a vegetable peeler having a rotatable feed arm supported on the frame through a gear housing having a bottom opening for reception of the arm, the housing carrying a driving gear having internal teeth and means on the feed arm engageable with the teeth for driving the arm.

A further object of the invention is the provision of means responsive to movement of the feed arm for disengaging the arm from the driving gear when the arm reaches the end of its stroke.

A still further object of the invention is the provision of a vegetable peeler having a rotatable feed arm, a cutter arm pivotally supported thereon, and means responsive to rotation of the cutter arm on the feed arm for declutching the feed arm and for latching the cutter arm in an inoperative position.

Another object of the invention is the provision of a vegetable peeler having improved means for limiting the approach of the cutter to the impaler.

Other objects of the invention are the provision of means for preventing back lash in the feed arm drive gear, of an improved impaler, of improved cutter elements for either peeling or slicing and of improved means for holding the cutter and guard.

Still further objects and attendant advantages will become apparent to those skilled in the art from the following description and the accompanying drawings, in which—

Figure 1 is a side elevation of the vegetable peeler in the form of an attachment for an electric beater showing its manner of attachment to the beater;

Fig. 2 is a front view of the peeler attachment shown partly in section, the section being taken on the line 2—2 of Fig. 7;

Fig. 3 is a section on the line 3—3 of Figure 1 showing the cutter arm in its inoperative or latched position;

Fig. 4 is a section on the line 4—4 of Figure 1;

Fig. 5 is a section on the line 5—5 of Fig. 4;

Fig. 6 is a section on the line 6—6 of Fig. 5, showing the cross-sectional shape of the impaler;

Fig. 7 is a section on the line 7—7 of Fig. 2, showing the feed arm at the start of its stroke;

Fig. 8 is a section on the line 8—8 of Fig. 2, showing the feed arm at the end of its stroke;

Fig. 9 is a section on the line 9—9 of Fig. 8, showing the relationship between the internal gear, the feed dog, and the declutching cam and stop;

Fig. 10 is a face view of the friction plate;

Fig. 11 is a top view of the peeling attachment, the spindle being in section, showing in solid lines the start of the feed arm stroke and in dotted lines the end of the feed arm stroke;

Fig. 12 is a side view of the upper end of the cutter arm showing the cutter and cutter arm finger, and Fig. 13 is a section on the line 13—13 of Fig. 12.

We have herein shown the vegetable peeler in the form of an attachment for use with a power operated beater and, while it is of particular advantage in this combination, as will presently be pointed out, it should be understood that any suitable means may be utilized for driving the peeler and that the various structural features thereof are in no wise limited to use on such an attachment. The peeler contemplates the provision of a casing which also serves as a frame, receivable for support on some part of the beater, in this instance, on the bowl-supporting portion and having a spindle arranged for driving connection with the beater, the casing and spindle being readily removable from support on the beater for convenient interchangeable use with other power driven kitchen appliances. An impaler for supporting the vegetable to be peeled is driven from the spindle to rotate the vegetable about the impaler as an axis. A feed arm, offset from the vertical plane of the impaler, is also driven from the spindle so that its free end moves through an arc of which the impaler more or less resembles the chord of the arc. The feed arm carries a cutter arm which, in turn, supports a cutter in operative relationship with the vegetable on the impaler, rotation of the feed arm causing the cutter to move longitudinally of the impaler. Spring means maintains the cutter in contact with the surface of the vegetable.

Referring to the drawings, the particular form of peeler herein shown is arranged for attachment to a beater having a bowl-supporting table 15, a vertically inclined pedestal 16 carrying a motor 17 on a pivot 18. The casing of the motor 17 has a switch 19 at its rear end and a handle 21 at its top, the forward end of the casing being provided with a gear housing 22 carrying depending shafts 23 and 24 and an upwardly extending power take off 25. The shafts 23 and 24 are provided with axial bores 26 having cross-pins 27, the bores being designed for the reception of spindles of various devices adapted to be driven by the motor, and the pin 27 being receivable in slots of such spindles.

The peeler comprises a vertically disposed housing 28 constituting a part of the frame of the potato peeler and having offset gear housings 29 and 31 on opposed sides. The lower end of the casing 28 carries a foot 32 for reception on the bowl-supporting portion 15 of the beater and is provided with buttons 33 receivable in openings 34 in the bowl-supporting portion 15 to prevent lateral movement of the casing with respect to the portion 15. A spindle 35 is carried in the casing 29 and projects from the upper end of the casing into the bore 26 of the beater shaft 24, the upper end of the spindle having a slot 36 for reception of the pin 27 to establish driving relationship between the shaft 24 and the spindle 35. The spindle 35 is journaled in a cap 37 (Fig. 4) threaded into the upper end of the casing 28 and at its lower end is journaled in the casing at 38, a thrust bearing 39 being threaded into the lower end of the casing. Worm gears 41 and 42 are formed on the spindle 35 at spaced points, the worms being pitched in opposite directions so that the thrusts on the spindle, developed when the worms drive companion worm gears will tend to balance so as to substantially eliminate end thrust on the spindle.

A worm gear 43 in the gear housing 29 engages the worm 42 and is supported upon the shank 44 of an impaler designated generally by the numeral 45 (Fig. 5), the impaler being journaled in the gear housing 29 at 46 and being journaled in a cap 47, as shown at 48, the cap being threaded into the gear casing, as shown at 49, to close the casing and to form bearing support for the impaler. Bosses 51 and 52 on the inner surface of the casing and the cap, respectively, provide bearing surfaces for opposite sides of the worm gear 43 to prevent endwise movement of the impaler. The exposed end of the impaler 45 carries a blade 53 having a cross-sectional shape shown in Fig. 6 and consisting of a slender body portion 54 provided with flanged side edges 55 and 56, the flanges extending in opposite directions. By making the impaler blade in this shape, we are enabled to securely hold the vegetable when the vegetable is forced over the slightly pointed end 57 of the blade. This particular shape appears to be very effective in preventing the vegetable from splitting or breaking down when the impaler is inserted, and enables the operator to place the vegetable on the impaler and remove it therefrom with great ease.

A housing 58 is secured to the gear casing 31 by means of screws 59 and serves as a closure of one side of the gear casing. The housing 58 carries a feed shaft 60 journaled therein, as shown at 61 and 62 (Fig. 7). One end of the shaft 60 extends into the gear housing 31 and carries a worm gear 63 meshing with the worm 41 and driven thereby, a screw 64 in the casing 31 providing end support for the shaft 60 and maintaining the hub 65 of the worm gear 63 in bearing relation with a boss 66 forming the bearing 61. The opposite end of the feed shaft carries a worm 67 while the opposite end of the housing 58 carries a gear casing 68 providing a gear chamber 69 having communication with the worm 67, the upper side of the gear chamber 69 being closed and the bottom end being open for the reception of the pivoted end 71 of a feed arm 72.

The pivotal end 71 of the feed arm is provided with a circular rib 73 receivable in the open end of the casing 68 against the inner surface of the marginal side walls and with a bearing shoulder 74 for receiving the lower edge of the casing 68 providing a relatively tight joint for rotation of the feed arm about the vertical axis of the casing 68. A pivot pin 75 passes axially through the pivotal end 71 and has a shoulder 76 bearing against the inner face of the casing 68 and an extension 77 extending through the casing, the pivot pin being drawn tight by a screw 78. A spring washer 79 is positioned on the pivot pin 75 between the removable head and the end 71 of the feed arm to hold the parts together and apply a frictional pressure between the parts to prevent looseness and back lash. The pivot pin 75 provides a pivot fixed to the casing 68 upon which the feed arm 72 may rotate. Interposed between the pivoted end 71 of the feed arm and the top of the casing 68 is a gear 79 having external teeth 81 engaged by the worm 67 to drive the gear. The bottom surface of the gear 79 is provided with a circular opening 82 within which are provided internal gear teeth 83. The gear has a hub 84 for rotatably supporting the gear on the pivot pin, axial movement of the gear in one direction being limited by the top of the casing 68 and in the opposite direction by means of a plate 85 also positioned on the pivot pin 75 and seated in the pivoted end 71 of the feed arm. A feed dog 86 is fixedly secured to a push rod 87 axially positioned in the feed arm 72 and is movable within a recess 88 in the pivoted end between an engaged position in which the teeth 89 thereof (Fig. 8) engage the internal teeth 83 and a position in which the teeth 89 are out of such engagement. The feed dog 86 extends through a slot 91 in the plate 85, the dog being guided and supported against lateral movement by the edges of the slot 91. A cam element designated generally by the numeral 92 is affixed in the walls of the casing 68, as shown at 93, and projects into the gear chamber 69, as shown in Figs. 8 and 9, in a plane just above the plate 85 and in a position such that a sloping cam face 94 will engage the feed dog 86 when the feed arm moves into the dotted line position shown in Fig. 11 to withdraw the teeth 89 on the feed dog from engagement with the teeth 83 on the feed gear, thereby disconnecting the drive between these two elements and determining the end of the feed stroke. A stop 95 serves as an abutment against which the feed dog comes to rest, positively preventing further movement of the feed arm. The pivoted end 71 of the feed arm also carries an inwardly extending ledge 96 which extends through a slot 97 in the plate 85, the ledge being so located that when the feed arm is moved to the full line position shown in Fig. 11 one edge of the ledge will come into contact with the cam element 92 to determine the other limit of the feed arm movement.

Thus, when the feed arm 72 occupies the full line position shown in Figure 1 and the push rod 87 is moved outward the teeth 89 of the feed dog enter into engagement with the internal teeth 83 of the gear 79, establishing driving connection between the gear and the feed arm. Rotation of the shaft 60 causes rotation of the gear and corresponding rotation of the feed arm 72 until the gear and feed arm reach the angular position shown in Figs. 8 and 11, whereat the feed dog 86 contacts the sloping cam surface 94 of the cam element 92, riding along this surface until the teeth 89 are moved out of engagement with the internal teeth on the gear. This brings the feed dog into engagement with the stop 95, completing the feed stroke of the arm 72. The plate 85 serves as a bearing member for the gear 79 and to support and guide the feed dog 86. The plate 85 is located by means of ribs 98 receivable in notches 99 in the plate 85.

The push rod 87 is provided with an enlarged end 101 to provide an abutment for a spring 102 positioned in a relief 103 between the push rod and the arm 72, the spring urging the push rod to the right, facing Fig. 3, or in a direction such as to engage the feed dog 86. The outer end of the feed arm 72 is provided with a socket 104 for the reception of a pivot portion 105 of a cutter arm 106, the socket 104 being enclosed along its top and sides by a top lip 107 and side lips 108 and 109. These lips, as will presently be described, serve to prevent the entrance into the joint of the products of the peeling operations. The pivot portion 105 of the cutter arm lies at an angle approaching 90° with respect to the general inclination of the remainder of the cutter arm so as to enter the bottom opening of the socket 104 and the arm is provided with a lip 111 adjacent the pivot portion to normally close the opening into the socket 104 necessitated by the movement of the cutter arm therein. The pivot portion 105 is supported in the socket portion 104 on a horizontal axis and is rotatable thereon between an operative position approaching the vertical and an inoperative inclined position. A spring having loops 112 and 113 on opposed sides of the pivotal portion 105 acts between the feed arm and the pivotal portion to urge the cutter arm in a counterclockwise direction facing Fig. 2, a screw 114 acting as a stop against the edge of the upper lip 107 to limit the approach of the cutter arm toward the impaler. The pivotal portion 105 is provided with a relief 115 (Fig. 2) spaced from the forward edge 116 of the push rod 87 while the cutter arm occupies its operative position, the relieved surface being so shaped as to permit rotation of the cutter arm about its pivot pin 117 within limits. A cam face 118 on the pivot portion serves by contact with the edge 116 to move the push rod 87 to the left facing Fig. 3, so as to disengage the feed dog 86. A cam face 119 serves as a stop or latch, bearing against the edge 116 so that the springs 112 and 113 are ineffectual to rotate the cutter arm to its operative position. Thus, the relieved surface 115 and the cam surface 119 represent the two positions of the cutter arm. When the cutter arm occupies the position shown in Fig. 2, the end 116 of the push rod 87 does not bear against the cam portion 115, thus permitting free oscillation of the cutter arm. When the cutter arm is moved to the position shown in Fig. 3, the cam surface 118 moves by the end 116, declutching the feed arm. Beyond this point the cam surface 119 maintains the cutter arm in its inoperative position. These cam surfaces and the push rod 87 thus serve two distinct purposes, that of latching the cutter arm in its inoperative position and that of declutching the feed arm. These two operations are performed simultaneously so that whenever the cutter arm is thrown out of its operative or cutting position the feed drive is disconnected and consequently during the interval in which the cutter is inoperative the angular position of the feed arm remains unchanged so that the cutter arm may simply be rotated back into its operative position to take up its cutting operations at the point of their interruption.

The upper end of the cutter arm 106 is bifurcated, as shown at 121, to provide a cutter supporting leg 122 and a guard supporting leg 123. A cutter 124 presently to be more fully described is supported along the upper surface of the cutter leg 122 by means of a screw 125. The guard supporting leg 123 is provided with a ledge 126 arranged to support a guard 127 and with a flange 128 for the reception of a guard adjusting screw 129. The guard 127 is secured to the ledge 126 by means of a screw 131 passing through a slot 132 in the guard and into the ledge 126. The rear end of the guard is upturned, as shown at 132, for the reception of the circumferentially grooved end 133 of the screw 129. It will be seen that through this arrangement rotation of the screw 129 brings about lengthwise movement of the guard 127 whereby the relative position of the guard with respect to the cutter 124 may be adjusted to adjust the depth of the cut made by the cutter.

The cutter, best shown in Figs. 12 and 13, consists of a flat shank 134 having an angularly disposed transversely curved plate 135, the blade terminating at its forward end in an arcuate sharpened cutting end 136, the cutting end being shown to best advantage in Fig. 11. The guard 127 also has a shank portion 137 and a blade portion 138 curved both longitudinally and laterally and having a forward end 137 of substantially the same curvature as the forward end of the cutter. As shown in Fig. 2, the guard is supported above the cutter with the forward end 139 thereof in spaced relation to the forward end 136 of the cutter, the cutter and guard being adapted to come into contact with the vegetable being peeled in the manner shown in Fig. 2. The purpose of the guard is to limit the depth of cut made by the cutter and to prevent the springs 112 and 113 from urging the cutter into the vegetable to an excessive depth. The pointed end of the guard and the cutter permits the cutter to closely follow the curvature of the vegetable and to enter into relatively small depressions and recesses in the vegetable.

The screw 114 and lip 107 normally limit the approach of the cutter to the impaler and determine the smallest arc capable of being inscribed by the cutter during the pivotal movement of the feed arm and the cutter normally inscribes an arc of a true circle, approaching as close to the impaler as safely possible. However, in order to bring this path of the cutter well out beyond the end of the impaler and in order to make it possible for the cutter to operate close to the impaler at the start of its movement, the pivotal point of the feed arm is positioned so that the arc inscribed by the cutter would normally intercept the impaler near the shank. This permits of carrying the peeling operations well toward the center of the axis of rotation of the vegetable. In order to take care of variations in the end shape of the vegetable to be peeled and to care for chance differences in the extent to which the impaler is inserted in the vegetable, we have provided a short travel for the cutter out of its normal arcuate path at the start of the cutting operations. This permits the vegetable to be peeled more thoroughly at its impaled end and prevents all possibility of the cutter coming into contact with the impaler. This consists of a finger 141 extending laterally outward from the guard supporting leg 123 and having an arcuate cam surface 142 cooperable with a projection 143 on the gear casing 29. The shape of the cam surface 142 is such that the cutter is prevented from following its normal arcuate course, the cutter arm 106 being rotated so that the pin 114 is out of contact with the edge of the lip 107. As the feed arm 72 rotates, the cam surface 142 moves along the projection 143 until the end of the cutter comes into contact with the vegetable and the guard 127 takes up the task of limiting the approach of the cutter.

In use, a vegetable, such for instance as a potato shown at 144 in Fig. 2, is placed on the impaler with the impaler substantially at the longitudinal center line of the vegetable. The feed arm and cutter arm are then rotated to the angular position shown in Fig. 11, the cutter arm occupying the position shown in Fig. 2 during such rotation to declutch the feed arm. The cutter arm is then rotated about its horizontal axis into the position shown in Fig. 11 and the motor is started. The cutter will then follow the dotted line position shown in Fig. 11 as modified by the surface of the vegetable, the springs 112 and 113 maintaining the cutter and guard against the surface of the vegetable throughout the travel. As the impaler and vegetable rotate the feed arm 72 moves slowly about the pivot pin 75, the cutter producing a helical cut of measured depth on the surface of the vegetable. When the feed arm reaches the dotted line position shown in Fig. 11, it is automatically declutched and stopped though the impaler will continue its rotation until the motor is shut off. At any time during the feeding stroke of the feed arm 72, the cutter arm 106 may be rotated into its inoperative position, thereby declutching the feed arm so that the feed arm and cutter may be readjusted to any desired position as, for example, should a bad spot appear in the potato 144 so that it is necessary for the peeling operations to be carried to a greater depth in a limited area, the operator may rotate the cutter arm to its inoperative position, thereby declutching the feed arm and then rotate the feed arm backward, whereupon with return of the cutter arm to its operative position a new cut will be taken in the potato.

Attention is directed to the fact that the provision of opposed worms on the spindle 35 permits of the elimination of a large number of gears heretofore employed for the purpose of obtaining the desired movements. It will be seen that the relative distance between the axes of the worm gears may be altered by altering the distance between the worms 41 and 42 without, in any way, affecting the amount of gearing required to drive the feed arm. Of further importance is the substantially complete elimination of end thrust through the provision of worms of opposed pitch so that the end thrust created by the operation of the worms is substantially equalized.

Attention is also directed to the fact that all of the operating parts of the peeler are enclosed and protected from the juices and refuse generated by the peeling operations. This is of particular importance since during the peeling operations juice drips and is thrown from the vegetable. These juices normally contain a considerable quantity of starches and similar material which clog the working parts with surprising rapidity. These parts are all connected through bottom openings such that the juices cannot enter into contact with the operating parts.

Another feature of the invention lies in the simple and effective means for driving the feed arm and for clutching and declutching the feed arm to the gear. It will be observed that once the cutter is placed into operative position with respect to a vegetable, the peeler requires no further attention until the peeling operation is completed and even then does not demand the immediate attention of the operator since the feed arm merely moves out to its declutched position and stops and no harm is done if the operator does not immediately shut off the machine.

Attention is also directed to the convenient and rapid manner of controlling the cutter. Movement of the cutter arm from its operative to its inoperative position serves to de-clutch the feed arm and terminate the feeding operations and serves also to latch the cutter arm in its inoperative position. Likewise, this movement of the cutter arm by declutching the feed arm permits the feed arm to be rotated into any required position to put the finishing touches on the peeling operation or to repeat the operation, if desired.

The guard 127 may be drawn back so that the cutter will be caused to make a relatively deep cut for the purpose of cutting the potato into strips for making shoestring potatoes. During this operation, it is only necessary for the operator to start the cutter in the position shown in full lines in Fig. 11 and permit the feed arm to move through so much of its stroke as may be required for the cutter to cover the potato. Thereupon, the cutter arm 106 is swung about its horizontal axis and the feed arm is rotated back to its starting point whereupon the cutter is again caused to engage the potato and the operation is continued without in any way disturbing the rotation of the potato and impaler, the operation being carried out without shutting off the power.

Another feature of advantage is the friction plate positioned between the feed arm and the feed gear for the purpose of providing a hardened wearing surface for the gear and the feed dog and to provide sufficient friction between the parts to prevent back lash. A single cam serves as a stop to limit the feed arm at its starting position and also to limit movement of the feed arm at the end of its stroke, at which point the cam serves to throw out the feed dog.

Novel means are provided for altering the normal arcuate path of the cutter toward the start of the cutting operations for the purpose of permitting a better peeling job at the end of the vegetable and to maintain the cutter out of contact with the impaler.

While we have thus described and illustrated a specific embodiment of our invention, we are aware that numerous alterations and amendments may be made therein without materially departing from the spirit of the invention and we do not wish to be limited except as required by the prior art and the scope of the appended claims, in which—

We claim:

1. The combination in a vegetable peeler attachment for mixing machines, of an impaler for carrying a vegetable, cutter mechanism movable to remove the peel from the vegetable, a driven spindle, spaced oppositely pitched worms on the spindle, a worm gear engaging one of said arms for rotating the impaler, a shaft carrying a worm gear engaging the other worm of the spindle and also carrying a worm, and a worm gear engaging said last mentioned worm for oscillating the cutter mechanism longitudinally of the impaler.

2. The combination in a vegetable peeler attachment for mixing machines, of a rotatable impaler for carrying a vegetable, cutter mechanism oscillable longitudinally of the impaler to remove the surface from the vegetable, and means for driving the impaler and cutter mechanism in timed relationship including a driven spindle, spaced worms on the spindle, a worm gear for rotating the impaler from one of said worms, a shaft carrying a worm gear engaging the other worm of the spindle and also carrying a worm, a worm gear for oscillating the cutter mechanism operable from the worm on said shaft, and a vertically disposed casing surrounding the spindle for supporting all of the elements and enclosing said worms and gears to protect the same and facilitate cleaning.

3. The combination in a vegetable peeler having an impaler for carrying a vegetable and a cutter, of means for carrying the cutter comprising a feed arm supported for rotation on a transverse axis to move the cutter longitudinally of the impaler, means supporting the cutter on the feed arm manually rotatable between a cutting position and a remote position, a gear located at one end of the feed arm on a transverse axis, means for rotating the gear, clutch means for establishing driving connection between the arm and the gear, means for engaging the clutch upon rotation of the cutter into the cutting position and disengaging the clutch upon rotation thereof to the remote position, and a casing for substantially completely enclosing said gear, said means for rotating the gear, said clutch means, and said means for engaging the clutch, whereby to prevent access of the juice and refuse of the peeling operations to all rotating and bearing parts and to provide for washing of the parts without disturbing the lubrication thereof.

4. The combination in a vegetable peeler having a cutter and an impaler for rotatably carrying a vegetable, of means for carrying the cutter comprising a feed arm supported to turn about its end on a transverse axis, a gear on the end of the feed arm rotatable on said transverse axis having internal and external teeth, means engaging the external teeth for driving the gear, and a dog on the arm selectively engageable with the internal teeth in response to predetermined movement of the cutter to establish driving connection between the gear and the arm.

5. The combination in a vegetable peeler having a cutter and an impaler for rotatably carrying a vegetable, of means for carrying the cutter comprising a feed arm supported to turn about its end on a transverse axis through a predetermined angularity, a cutter arm positioned for rotation on the feed arm, a gear on the end of the feed arm rotatable on said transverse axis having internal and external teeth, means engaging the external teeth to drive the gear, a dog carried on the feed arm selectively engageable and disengageable with the internal teeth in response to predetermined movement of the cutter arm to establish driving connection between the gear and the arm, and cam means for disengaging the dog when the arm reaches a predetermined position to terminate the movement thereof.

6. The combination in a vegetable peeler, of a closed casing having a vertically disposed portion and a laterally disposed portion forming a frame, driving elements enclosed in the casing, an impaler supported in the casing and driven by said elements, a feed arm below the impaler driven by said elements and received in a bottom opening in one end of the laterally disposed portion of the frame, the arm forming a closure for the opening, a cutter arm positioned for movement in a bottom opening on the feed arm, and a cutter on the cutter arm movable over the surface of a vegetable on the impaler through movement of the impaler and feed arm, the position of the frame and feed arm openings preventing juice from the vegetable from contacting the gearing.

7. The combination in a potato peeler adjustment for power driven household mixers, of a vertically disposed casing, an impaler carried on the casing and driven therefrom, a horizontally disposed casing fixedly carried on the vertical casing in a plane spaced from the impaler, a feed arm pivotally carried on the last mentioned casing for rotation about one end in a horizontal plane, a vertically disposed cutter arm carried on said feed arm for rotation in a vertical plane toward and away from said impaler, a spindle enclosed in said vertically disposed casing driven from said mixer, a shaft in said horizontally disposed casing, worm drives within said vertically disposed casing for driving said impaler and said shaft from the spindle, a drive enclosed in said horizontal casing for rotating the feed arm from said shaft, and means enclosed within the feed arm for engaging and disengaging the last mentioned drive upon rotation of the cutter arm through a predetermined degree.

8. The combination recited in claim 7 wherein means are provided for preventing backlash in the last mentioned drive.

9. The combination in a potato peeler attachment for power driven household mixers, of a casing having a foot for supporting the attachment, a vertically disposed spindle extending upwardly from the casing for driving connection with and lateral support from the mixer, upper and lower oppositely pitched worms on the spindle, an impaler extending laterally from the casing at the upper worm, a worm gear on said impaler engaging the upper worm for rotating the impaler to impart rotation to the vegetable, a laterally disposed shaft carried on the casing at said lower worm, a worm gear on one end of said shaft engaging the lower worm to rotate the shaft, a worm at the opposite end of the shaft, a cutter oscillatable longitudinally of the impaler to remove the peel from the vegetable, a feed arm arranged to carry said cutter from one end thereof and a worm gear on the opposite end of said feed arm on a transverse axis engaging said last mentioned worm to oscillate the feed arm longitudinally of the impaler.

10. The combination in a potato peeler attachment for power driven household mixers, of a vertically disposed tubular casing having a laterally flared lower end forming a foot for supporting the attachment, a vertically disposed spindle positioned in the casing and projecting at its upper end beyond the casing for driving connection with and lateral support from the mixer, said casing having bearings near the upper and lower ends thereof for support of the spindle, upper and lower worms on said spindle adjacent said bearings, the worms being oppositely pitched to neutralize the longitudinally directed forces on the spindle occasioned by the driving action of the worms, a laterally disposed shaft journaled in the casing adjacent the upper worm for rotating an impaler, a worm gear positioned on said shaft within the casing and engaging said worm for driving the said shaft, a laterally disposed tubular casing positioned on the vertical casing adjacent the lower worm, an oscillatable feed arm positioned on the free end of said laterally disposed casing for rotation about a vertical axis, an upwardly projecting cutter arm pivoted on the feed arm for rotation on a horizontal axis, a cutter on the cutter arm for removing the peel from a vegetable positioned on the impaler, and driving means in the laterally disposed casing for oscillating said feed arm including a worm gear positioned for engagement with said lower worm.

11. The combination in a potato peeler attachment for power driven household mixers, of a vertically disposed slender casing of general tubular cross-section, said casing having a laterally flanged bottom forming a foot for support of the attachment, a spindle journaled longitudinally in said casing and projecting at its upper end beyond said casing for driving connection with said mixer, said connection providing lateral support for the casing, upper and lower worms on said spindle within said casing, a laterally disposed rotatable impaler journaled in the casing adjacent the upper worm, a worm gear on the impaler engaging the worm to rotate the impaler, a laterally disposed casing carried on the vertical casing adjacent said lower worm, a cutter mechanism carried on said laterally disposed casing for oscillation longitudinally of the impaler, and means for driving the cutter mechanism positioned within the laterally disposed casing and including a worm gear positioned for engagement with said lower worm.

IVAR JEPPSSON.
GEORGE BROWNING.